Nov. 26, 1957  H. W. MORGAN  2,814,260
PIE MAKING MACHINE
Filed Oct. 8, 1956  7 Sheets-Sheet 1

INVENTOR.
Harry W. Morgan,
BY Paul & Paul
ATTORNEYS

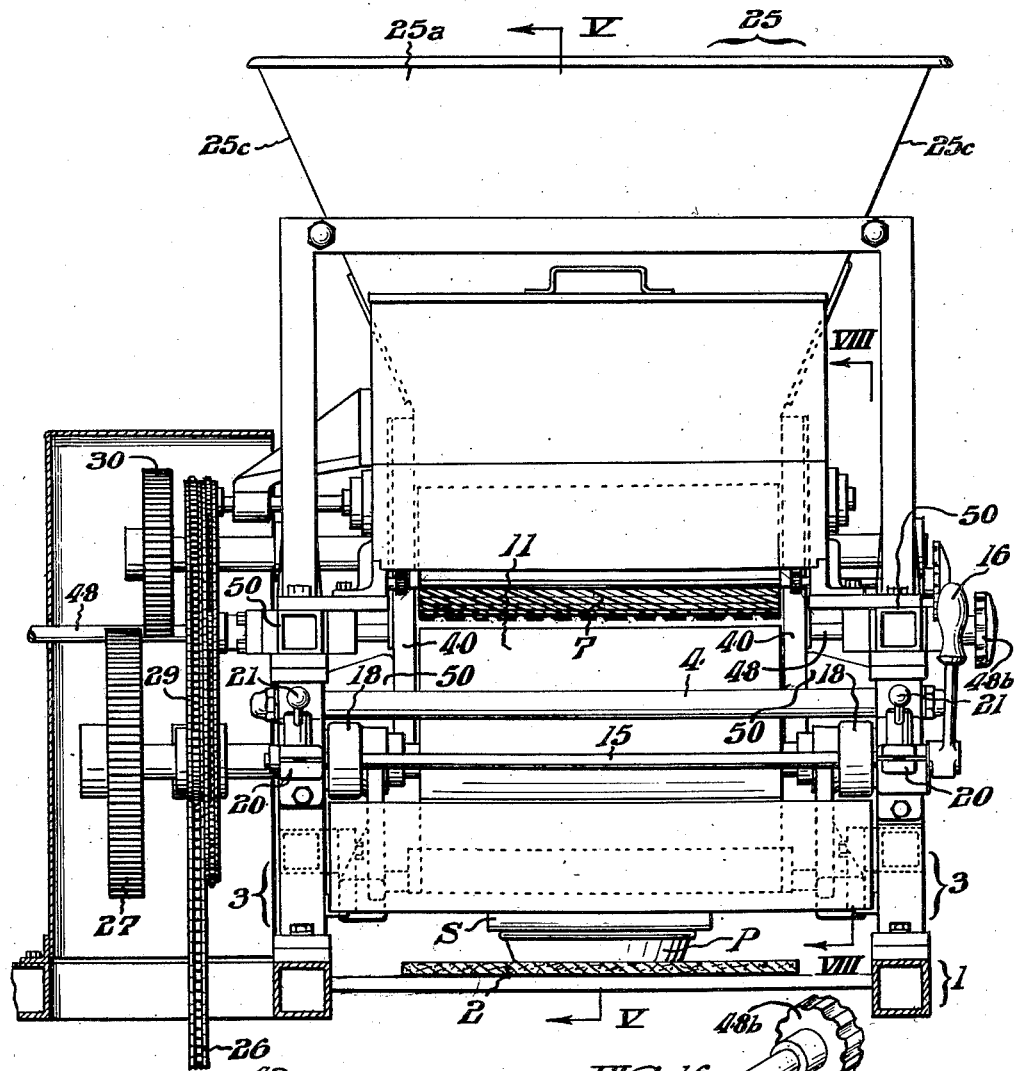

Nov. 26, 1957   H. W. MORGAN   2,814,260
PIE MAKING MACHINE
Filed Oct. 8, 1956   7 Sheets-Sheet 3

INVENTOR.
Harry W. Morgan,
BY Paul & Paul
ATTORNEYS

Nov. 26, 1957  H. W. MORGAN  2,814,260
PIE MAKING MACHINE
Filed Oct. 8, 1956  7 Sheets-Sheet 5

INVENTOR.
Harry W. Morgan,
BY Paul & Paul
ATTORNEYS

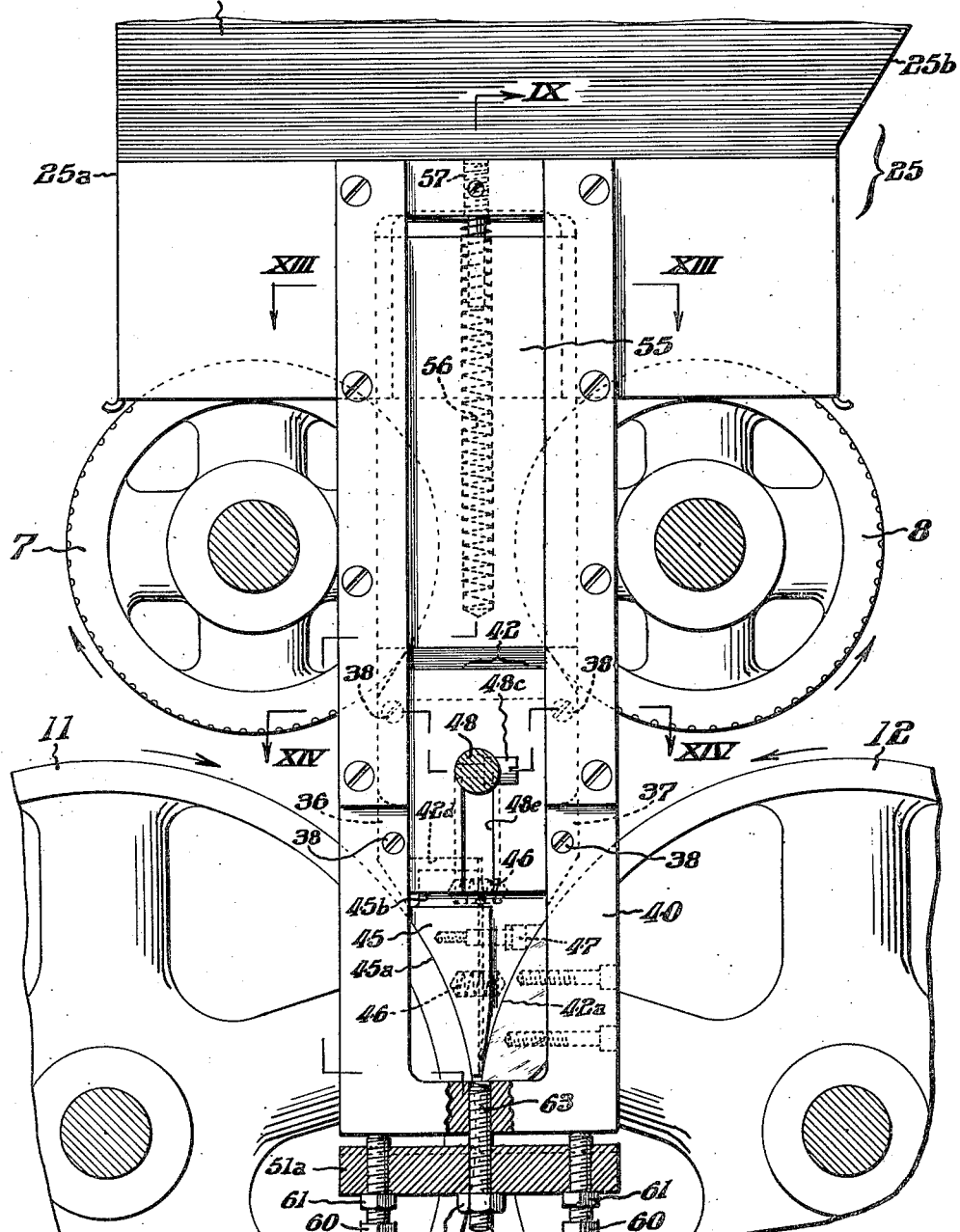

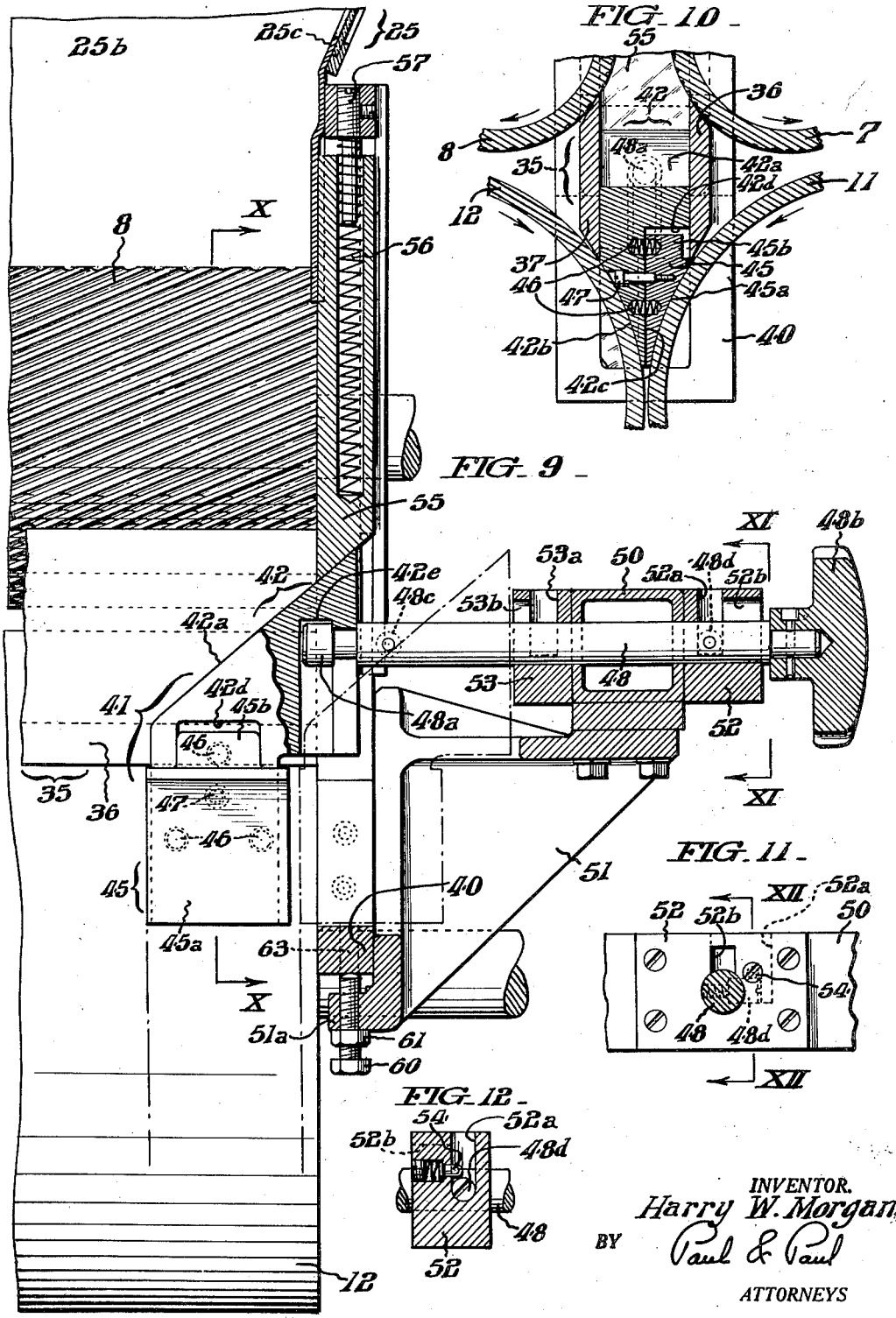

United States Patent Office 2,814,260
Patented Nov. 26, 1957

2,814,260

PIE MAKING MACHINE

Harry W. Morgan, Wilmington, Del., assignor to H. W. Morgan & Co., Inc., Philadelphia, Pa., a corporation of Pennsylvania Application October 8, 1956, Serial No. 614,647

10 Claims. (Cl. 107—12)

This invention relates to pie making machines. More specifically, it is concerned with the mechanism of pie making machines generally of the type disclosed in U. S. Patent 2,192,918, granted to J. F. Kohler on March 12, 1940, wherein the dough is drawn from a gravity discharge supply hopper by a pair of spaced upper oppositely-rotated rolls and fed into a compression chamber and from thence drawn by a pair of closer-spaced oppositely-driven delivery rolls and formed into a strip of uniform width and of the desired thickness for discharge upon pie plates as they are advanced on a conveyer, to form either the bottom or the top layers of the pies, the excess dough being thereafter trimmed off around the edges of the plates.

My invention has for one of its aims to make it possible, through provision of simple and reliable means for the purpose, to adjust the size of compression chamber and thereby vary the width of the dough strip extruded from between the bottom rolls, and so adapt the machine for covering pies of different sizes.

Another object of my invention is to provide an improved means whereby the lower strip delivering rolls of the machine can be adjusted, one relative to the other, for variation of the interval between them and variation, in turn, in the thickness of the extruded dough strip.

Other objects and attendant advantages will appear from the following detail description of the attached drawings, wherein:

Fig. 2 is a view partly in elevation and partly in transverse section taken as indicated by the angled arrows II—II in Fig. 1.

Fig. 8 is a fragmentary view taken as indicated by the angled arrows VIII—VIII in Fig. 2 and drawn to a larger scale.

Fig. 9 is a vertical section taken as indicated by the angled arrows IX—IX in Fig. 8.

Figs. 10 and 11 are fragmentary detail views taken as indicated respectively by the angled arrows X—X and XI—XI in Fig. 9.

Fig. 12 is a detail view in section taken as indicated by the angled arrows XII—XII in Fig. 11.

Figs. 13 and 14 are fragmentary views in horizontal section taken as indicated respectively by the angled arrows XIII—XIII and XIV—XIV in Fig. 8.

Fig. 15 is a perspective view showing the component parts of one of the end walls of the compression chamber.

Figs. 16, 17 and 18 are perspective views of various parts of the means provided for adjusting the end walls of the compression chamber.

Figure 1:
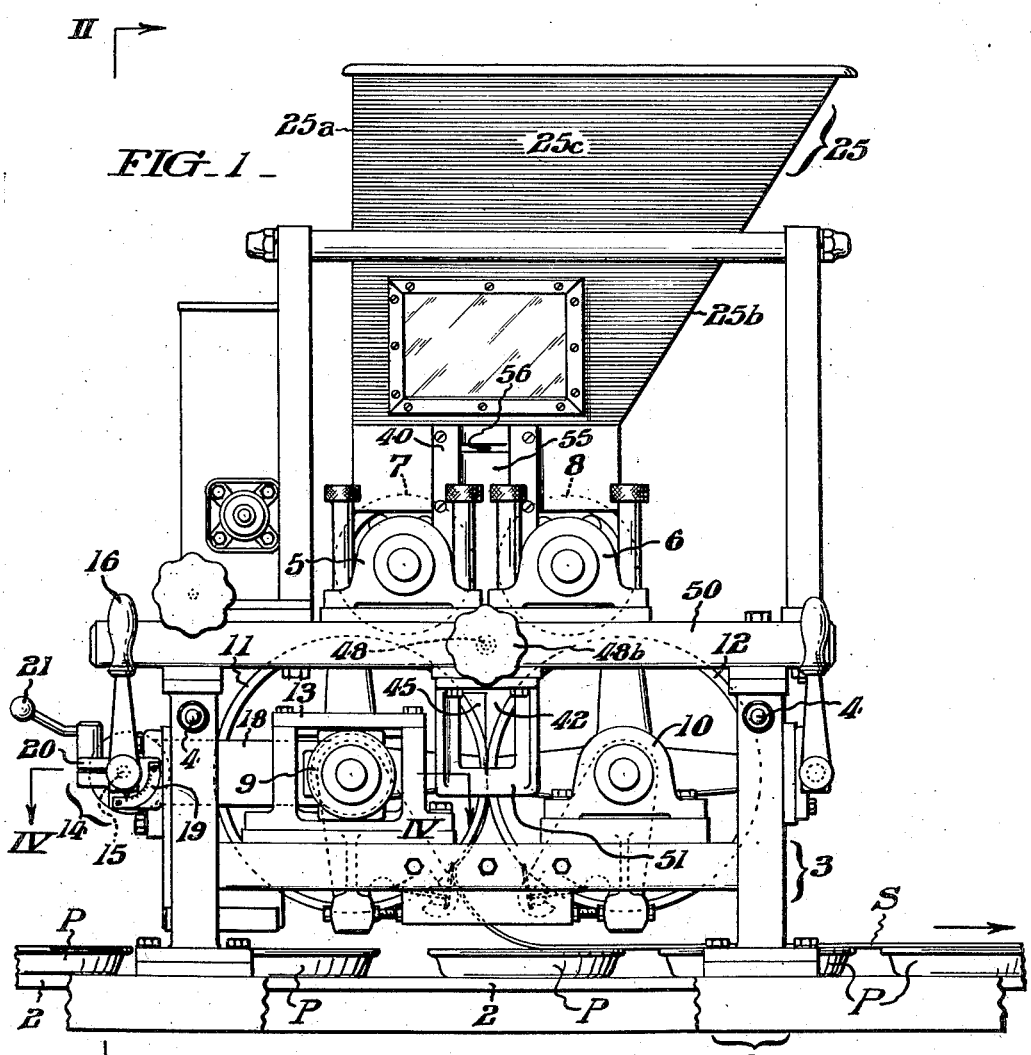
Fig. 1 is a fragmentary view, in front elevation, of a pie making machine conveniently embodying my invention.
Figure 3:
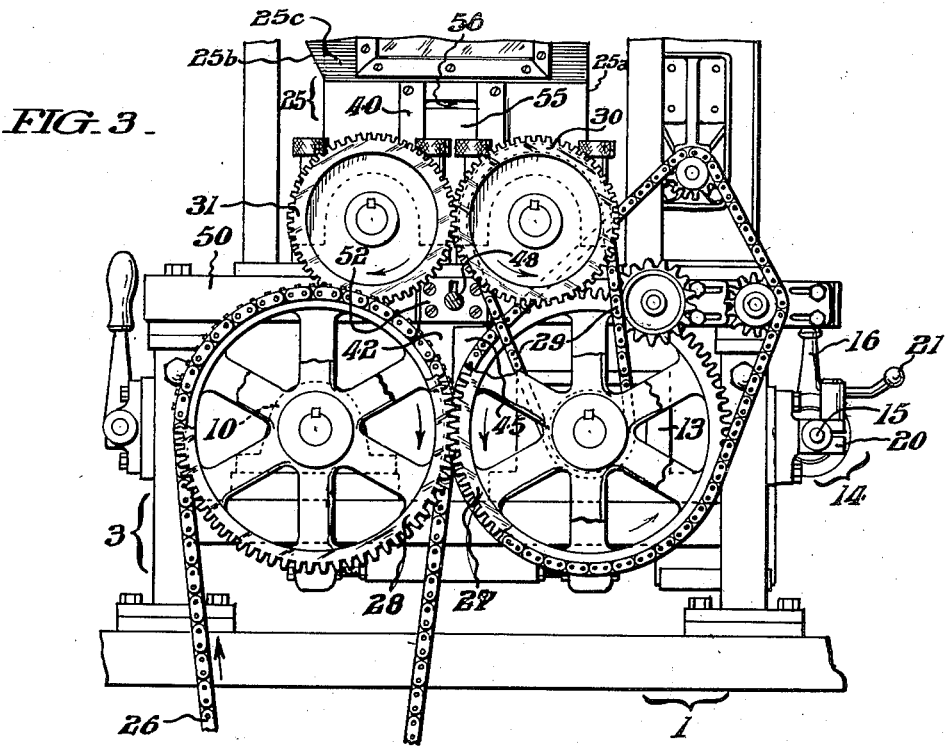
Fig. 3 is a fragmentary view showing the rear elevation of the machine.
Figure 4:
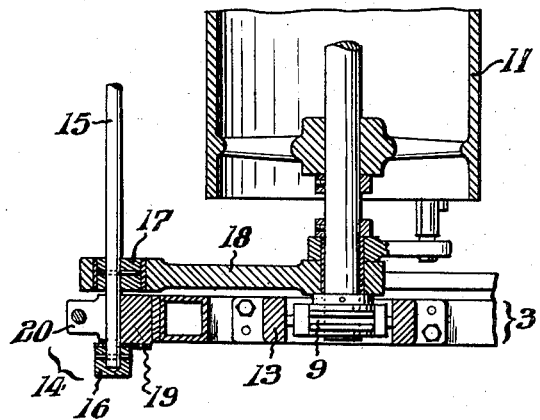
Fig. 4 is a fragmentary detail view in horizontal section taken as indicated by the angled arrows IV—IV in Fig. 1, and showing the means provided for relatively adjusting the spacing of lower dough strip delivery rolls of the machine.
Figure 5:
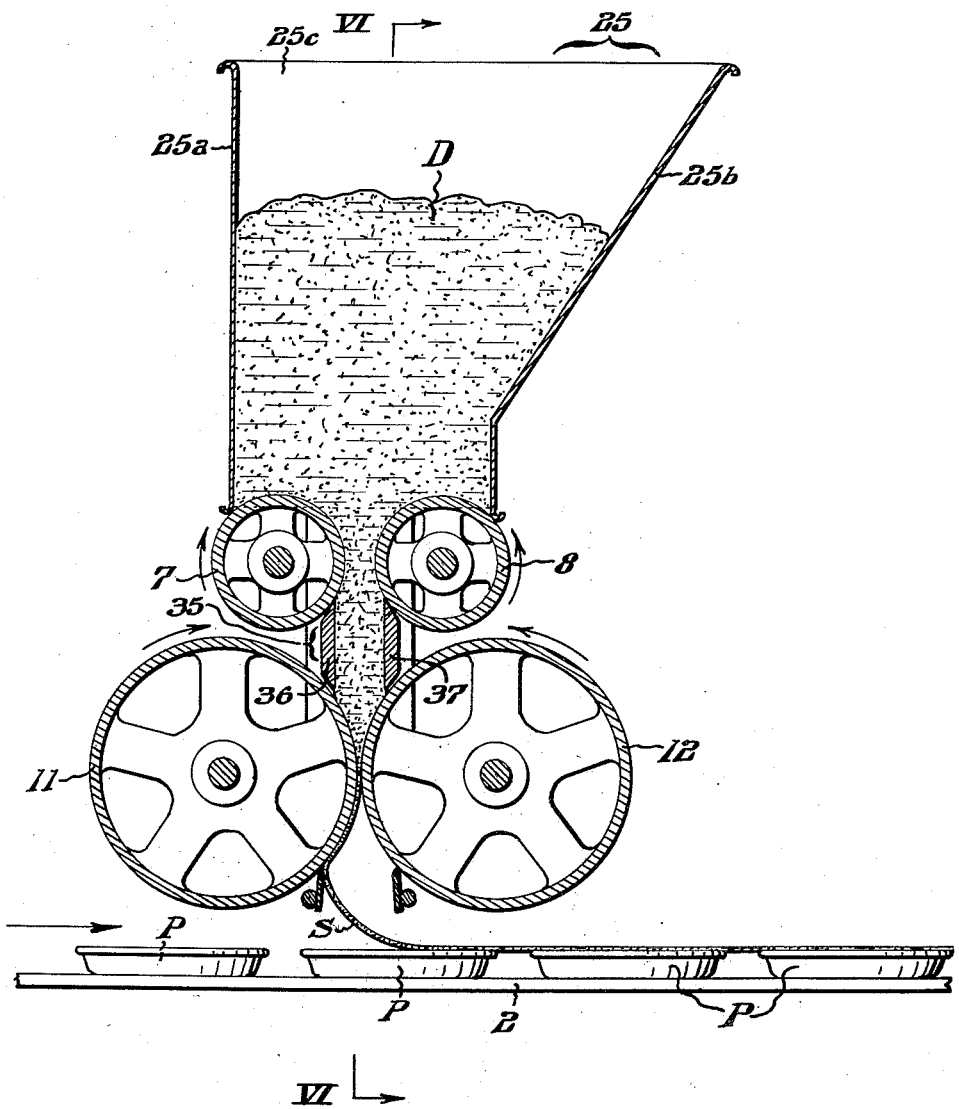
Fig. 5 is a longitudinal sectional view taken as indicated by the angled arrows V—V in Fig. 2.
Figure 6:
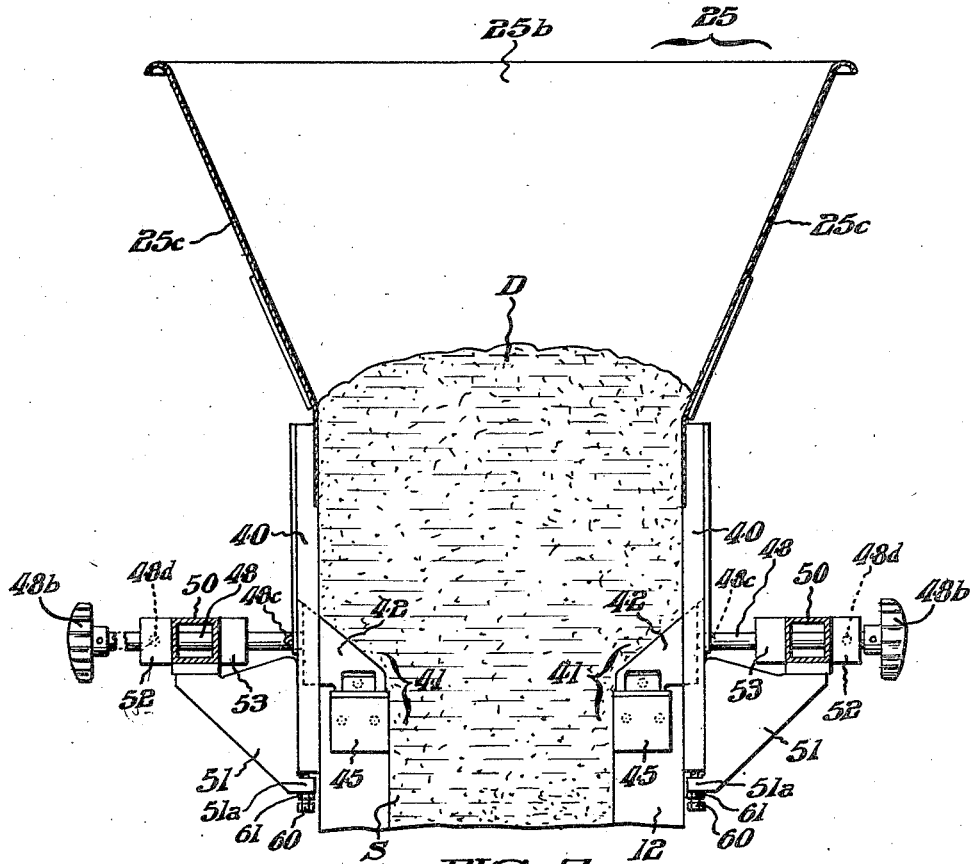
Fig. 6 is a transverse sectional view taken as indicated by the angled arrows VI—VI in Fig. 5.

Briefly described, the pie making machine herein illustrated for exemplification of my invention comprises a table 1 which is overtraveled by a belt conveyor 2 carrying plates P for pies to which the strip S of dough is applied. Rising from the table 1 are fixedly positioned open upright side frames 3 which are joined by tie rods 4. Mounted on the upper bars of the frames 3 are bearings 5 and 6 for the shafts of a pair of spaced spirally grooved dough feeding rolls 7 and 8, and on the lower bar of said frames are supported bearings 9 and 10 for the shafts of a pair of larger plain surfaced dough strip delivery rolls 11 and 12. The bearings 10 for the roll 12 are bolted fast to the lower bars of the frames 3, but the bearings 9 for the roll 11 are shiftable in guide yokes 13 bolted to said bars for adjustment of the roll 11 relative to the roll 12 by the means comprehensively designated 14 in Figs. 1–3. As shown, this adjustment means 14 includes a transverse rock shaft 15 which is operable by means of a hand lever 16, and which carries eccentrics, such as the one indicated at 17 in Fig. 4, engaged in the distal ends of links 18 whereof the opposite ends are apertured for passage of the shaft of the roll 11 through them. Swinging of the levers 16 in one direction will result, by virtue of this arrangement, in moving the roll 11 away from the roll 12 to increase the transverse interval between them and hence the thickness of the extruded dough strip S; while swinging of said levers in the opposite direction will be attended by movement of the roll 11 toward the roll 12 to decrease the interval between them and in turn decrease the thickness of the extruded dough strip S. The adjustments are made by coordination of a pointer on the hub of the lever 16 with a vernier scale shown at 19 in Fig. 1. The bearings 20 for the rock shaft 15 are split as is also shown in Fig. 1, so as to be clampable upon said shaft by tightening of clamp screw operating handles 21 to hold the adjustment.

The dough hopper indicated at 25 is suitably supported transversely between the frames 3 above the upper feed rolls 7 and 8, it having a straight front wall 25a, its rear and side walls 25b and 25c, 25c being sloped to facilitate gravitation of the dough D placed therein. As shown in Figs. 1 and 8, the end walls 25a and 25b of the hopper 25 partially overlap the upper feed rolls 7 and 8 which thus close the hopper at the bottom except for the transverse dough extrusion interval between them. The lower delivery roll 12 is driven through a sprocket chain 26 (Figs. 2 and 3) from a suitable source of power, not illustrated, and the roll 11 is rotated in unison therewith but in the opposite direction through a pair of intermeshing spur gears 27 and 28. By means of a separate sprocket chain 29, the upper feed roll 7 is driven from the shaft of the lower roll 11, and unison rotary motion in the opposite direction is transmitted from said roll 7 to the companion upper feed roll 8 through a pair of intermeshing spur gears 30 and 31. It is to be understood that the gear ratios are such that the rolls 7, 8 and 11, 12 are driven at surface speeds which will assure continuous delivery from the hopper 25 of an extruded dough strip S uniform in thickness. It is to be further understood that the belt conveyer 2 is driven, by suitable means (not illustrated), at a linear speed equal to the delivery rate of the dough strip S.

Figure 14:
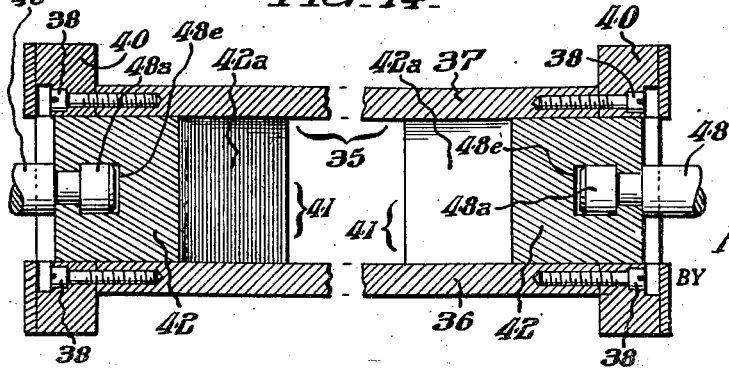

In order to make it possible to vary the width of the dough strip S extruded from the hopper 25 and so adapt the machine for operation upon pies of different sizes, I have made provisions as follows:

Disposed in the interval between the lower bight of the upper feed rolls 7 and 8 and the upper bight of the lower feed rolls 11 and 12 is a compression chamber 35 having spaced side walls 36 and 37 of which the top and bottom edges reach into close contiguity to the rolls 7, 11 and 8, 12 and are roundedly beveled respectively on curvatures concentric with the axes of said rolls. As shown in Figs. 8 and 14, the walls 36 and 37 are rigidly secured at opposite ends, by means of screws 38, to vertically arranged centrally open frames 40 which will be again referred to hereinafter. Fitting between the walls 36 and 37 of the compression chamber at opposite sides of the machines are end wall components 41 which are of multipartite construction, see Figs. 8, 9, 10 and 15. The upper part 42 of each end wall component has a top face sloped downwardly and inwardly as at 42a, and of which one side is rounded as at 42b (Figs. 10 and 15) on a curvature concentric with the axis of roll 12. As shown, the part 42 is recessed laterally as at 42c for accommodation of an inset part 45 having an arcuate face 45a whereof the curvature is conformative with the circumferential surface of the roll 11, and an upward lug projection 45b engaged in a narrowed upward extension 42d of the recess 42c in said part 42. The part 45 is pressed away from the part 42 by a plurality of compression springs 46 (Figs. 9, 10) and is held assembled with the part 42 by means of the screw shown at 47. It will be observed from Fig. 15 that the part 45 is somewhat wider than the part 42 and provided along one of its vertical edges with a flange 45c for overlapping the corresponding vertical edge of the recess in part 42 as shown in Fig. 8 to prevent oozing of the dough through the gap spacing said parts.

Figure 7:
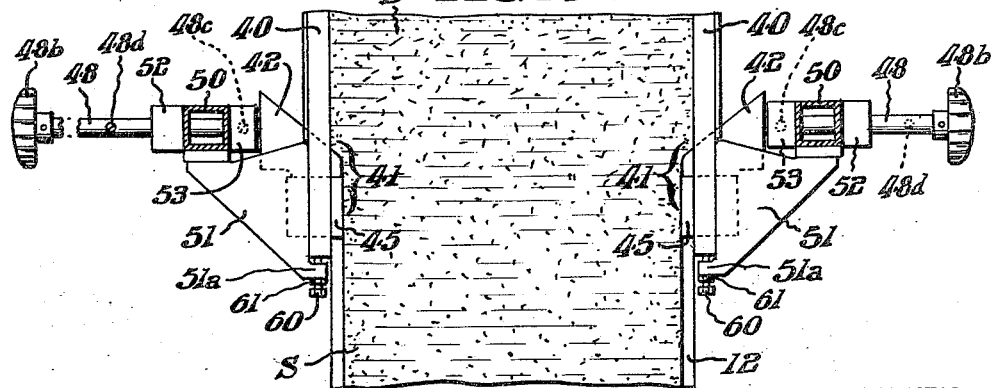
Fig. 7 is a fragmentary view corresponding to Fig. 6 showing the compression chamber of the machine differently adjusted for the production of a wider extruded dough strip.

Each end wall component 41 is adjustable between the side wall components 36 and 37 of the compression chamber 35 by means of a rod 48 (Figs. 9–12 and 16) having a head 48a at one end and a grasp knob 48b at the other end, said head being engaged in an undercut central vertical slot 42e in the back of the part 42. The rod 48 is rotatable and endwise shiftable in a guide bearing provided in the upper bar 50 of the corresponding side frame 3 of the machine whereto the bracket designated 51 is bolted, see Figs. 1 and 3. Projecting laterally from each rod 48 is a pair of spaced radial projections 48c, 48d (Figs. 9, 11, 12, 16). With the end wall component in the innermost position of adjustment as shown in Fig. 9, it is locked against accidental displacement by engagement of the lug 48d in a lateral notch 52a in a stop block 52 (separatedly illustrated in Fig. 18) affixed to one end of the guide bearing. By turning the rod 48 counterclockwise through a quadrant in Fig. 11, the projection 48d is brought into line with a clearance 52b in the block 52 while at the same time, the projection 48c is brought into line with a similar clearance 53b in a stop block 53 (separately illustrated in Fig. 17) affixed to the opposite end of the guide bearing 50. Accordingly, it will be seen that, upon being turned as just explained, the rod 48 can be drawn outwardly to bring the end wall component 41 to the position in which it is shown in broken lines in Fig. 9 and in full lines in Fig. 7. Upon thereafter turning the rod 48 clockwise through a quadrant, the projection 48c thereon will engage into a lateral notch 53a in the stop block 53 to hold the corresponding end wall component 42 of the compression chamber 35 in its outermost position of adjustment as will be readily understood. Spring biased keeper pins, such as the one shown at 54 in Fig. 12, serve to yieldingly hold the rod 48 against turning after the adjustments have been made.

Constrained to the frames 40 hereinbefore mentioned which are centered in the transverse vertical plane of the bights of the rolls 7, 8 and 11, 12 and disposed at sides of the machine, are slide plates 55 of which the bottom edges are beveled to conform with the top bevel faces 42a of the components 42 of the corresponding end wall components 41 of the compression chamber 35. As instanced in Figs. 8 and 9, each slide plate 55 is yieldingly urged downwardly by a spring 56 for maintenance of its lower edge in engagement with the bevel 42a of the component 42, the said springs being regulatable by adjustment of the buttress screws indicated at 57, as the corresponding end wall 41 is adjusted either inwardly or outwardly. From Figs. 8 and 10 it will be noted that the frames 40 are adjustable vertically by means of pairs of regulating screws 60 threadedly engaged in an underreaching projection 51a the corresponding brackets 57, upon loosening of jam nuts 61 associated with said screws and jam nuts 62 on central screws 63 which are fixed in the bottom end of said frames and pass through a clearance aperture in said projections. By virtue of the facilities just described, it is possible to raise or lower the end walls 41 of the compression chamber 35 relative to the rolls 7, 8 and 11, 12 as may be required. When the roll 12 is adjusted relative to the roll 11 by the means hereinbefore described for the purpose, it will be seen from Fig. 8 that the part 45 of each end wall component will be pressed, by the springs 46, in a direction away from the part 42 to follow the roll with its curved surface 45a maintained in contact with the surface of said roll as required.

Having thus described my invention, I claim:

1. In a pie making machine having a dough hopper open at the bottom, a pair of spaced opposingly-rotated feed rolls disposed beneath the hopper and extending partway up into the open bottom end of the latter, and a pair of closer-spaced oppositely-rotated dough strip delivery rolls disposed beneath the feed rolls with the bight between them in vertical alignment with that of the feed rolls; a compression chamber disposed in the space between the lower bight of the upper rolls and the upper bight of the lower rolls, said compression chamber comprising laterally-spaced side wall components of which the top and bottom edges extend into close proximity to the cylindrical surfaces respectively of corresponding pairs of upper and lower feed rolls, and end wall components fitting between the side wall components adjustable in the direction of the length of the rolls for variation of the width of the dough strip extruded by the two delivery rolls, and means for so adjusting the end wall components of the compression chamber.

2. The invention according to claim 1, in which the top and bottom edges of the side wall components of the compression chamber are round beveled to conform with the curvatures of the corresponding pairs respectively of the upper and lower feed rolls.

3. The invention according to claim 1, wherein the top surfaces of the end wall components of the compression chamber are downwardly sloped to facilitate flow of the dough in the hopper into the bight between the delivery rolls.

4. The invention according to claim 1, whereby the side walls of the compression chamber are connected at opposite ends to slides engaged in fixed vertical guideways, and further including means for adjusting the slides up or down in the guides as and for the purpose described.

5. The invention according to claim 1, wherein the adjustment means includes, for each end wall component of the compression chamber, a manipulating rod connected at one end to such end wall component, a fixed guide exteriorly of the hopper in which the rod is constrained with capacity for endwise shifting, and means embodied in the guide for locking the rod against axial displacement after adjustment of the end wall.

6. The invention according to claim 1, wherein the adjustment means includes, for each end wall component of the compression chamber, a manipulating rod rotatably connected to such end wall component and having a pair of spaced lateral projections intermediate its ends, a fixed guide exteriorly of the hopper in which the rod is axially and rotatably shiftable, stops at opposite ends of the guide respectively having spaced notches into which the respective projections on the rod can be selectively engaged upon partial rotation thereof to lock the end wall components of the compression chamber in different positions of adjustment.

7. The invention according to claim 1, wherein the top surfaces of the end wall components of the compression chamber are downwardly sloped to facilitate flow of the dough in the hopper into the bight between the delivery rolls, wherein plates constrained to vertical movement lap opposite ends respectively of the upper feed rolls and have their bottom edges beveled complementally to the beveled tops of the end wall components of the compression chamber, said plates being spring pressed downwardly for maintenance of their bottom edges in engagement with beveled top surfaces of the side wall components incident to in and out adjustment of the latter.

8. The invention according to claim 1, wherein the end wall components of the compression chamber have prolongations which extend downwardly into the upper bight between the delivery rolls and are rounded at opposite sides to conform with the curvature of said rolls.

9. The invention according to claim 1, wherein each end wall component of the compression chamber comprises two parts, one part engaged between the side wall components and having a downward prolongation with a recess in one side thereof, and the other part slidably engaged in the recess of the first part, the downward prolongations of the first part and the second part being disposed in the upper bight between the delivery rolls and having their side faces rounded to conform with the curvature of said rolls; means for maintaining the two parts assembled, and spring means yieldingly urging the second part outwardly of the recess in the first part; and further including means whereby the delivery rolls can be adjusted relatively to vary the interval between them and in turn the thickness of the extruded dough strip.

10. In a pie making machine having a pair of spaced rolls between which dough from a surmounted supply hopper is extruded in flat strip form; fixed bearings for the shaft of one of the rolls; fixed guides in which bearings for the shaft of the other roll are slidably engaged; and adjusting means for shifting the slidable bearings in the guides to vary the interval between the last mentioned roll and the first roll, said adjustment means including a rock shaft journalled in fixedly positioned split bearings and having eccentrics thereon, links connecting the eccentrics with opposite ends of the shiftable roll, and screw means operative to tighten the split bearings to secure the rock shaft against turning after the shiftable roll is adjusted.

References Cited in the file of this patent

UNITED STATES PATENTS

| | | |
|---|---|---|
| 697,663 | Rosborough | Apr. 15, 1902 |
| 738,242 | Romero et al. | Sept. 8, 1903 |
| 1,350,722 | Goodenberger | Aug. 24, 1920 |
| 1,519,569 | Vicars | Dec. 16, 1924 |
| 2,192,918 | Kohler | Mar. 12, 1940 |
| 2,323,907 | Harriss et al. | July 13, 1943 |
| 2,534,296 | Pike et al. | Dec. 19, 1950 |
| 2,596,277 | Naylor | May 13, 1952 |

FOREIGN PATENTS

| | | |
|---|---|---|
| 457,382 | Great Britain | Apr. 18, 1936 |